Patented Oct. 21, 1930

1,778,987

UNITED STATES PATENT OFFICE

ROYALE HILLMAN STEVENS, GERALD CHAD NORRIS, AND WILLIAM NELSON WATSON, OF BROKEN HILL, NORTHERN RHODESIA, ASSIGNORS TO THE RHODESIA BROKEN HILL DEVELOPMENT COMPANY, LIMITED, OF BROKEN HILL, NORTHERN RHODESIA

PURIFICATION OF ZINC SOLUTIONS

No Drawing. Application filed August 25, 1927, Serial No. 215,510, and in Southern Rhodesia August 13, 1926.

Applications for patent have been filed by us in Southern Rhodesia, August 13, 1926, No. 2036 and in Great Britain, September 1, 1926, No. 21561.

This invention relates to methods for the purification of zinc solutions, and has particular reference to the removal of impurities from zinc sulphate solutions which have been obtained from the treatment of ores or other metalliferous materials containing zinc, with sulphuric acid or spent electrolyte, prior to the electrolytic deposition of zinc from the zinc sulphate solution.

It is known that in order to obtain successful deposition of zinc from zinc sulphate solutions by electrolysis, the zinc sulphate electrolyte must be purified to a high degree from metallic impurities such as antimony, arsenic, copper, cadmium, cobalt and nickel, even small amounts of these impurities in the electrolyte seriously affecting both the efficiency of the electrolytic deposition operation and the purity of the metallic zinc product.

It is common practice to treat impure zinc solutions with metallic zinc, usually in the form of zinc dust or blue powder, whereby the more electronegative impurities such as copper, cadmium etc. are removed from solution. For the separation of impurities such as cobalt and nickel it is usual to conduct the zinc dust treatment at elevated temperatures, soluble copper and arsenic compounds in the requisite amounts being added to the solution prior to the addition of the zinc dust, these assisting in the more complete and rapid removal of the cobalt and/or nickel.

In the case of the zinc dust precipitation of the impurities cadmium, cobalt and nickel, these impurities tend to re-dissolve in the zinc solution through unduly long exposure of the solution and precipitate to the air which may occur through delays in the course of the filtrations operations for the separations of the zinc dust impurity precipitate from the purified zinc solution. Such re-dissolving of cobalt and nickel leads to serious operating difficulties in the subsequent electrolysis of the zinc solution. Where cadmium is re-dissolved, the zinc resulting from the electrolyzing operation is contaminated with cadmium as an impurity.

The present invention provides a method for the purification of zinc solutions and particularly zinc sulphate solutions prior to electrolysis, whereby undesirable metallic impurities such as copper, cadmium, nickel and cobalt can be completely eliminated from the solution in such a manner as to leave the solution highly suitable for the efficient operation of the subsequent electrolysis, and the production of metallic zinc of a very high degree of purity, and without any tendency for the metals of the impurity precipitate to re-dissolve in the solutions either as a result of introduction of air or of long periods of contact between the solution and the percipitate.

According to this invention impurities are precipitated from zinc solution and particularly zinc sulphate solution preparatory to electrolysis by treating the solution with a compound of a derivative of dithiocarbonic acid of the type MS. CS. OR. where M is a radicle of which the aforesaid compound is appreciably soluble in the zinc solution under treatment and where R is an organic radicle; in other words a compound of "xanthate" type. The radicle M is generally a metal but it can also be an atom, or group of atoms of any element or elements, the compound of which possesses the essential property of being appreciably soluble in the solution. Preferably R is the radicle of an alcohol; and as the compounds commonly called "xanthates," in which M is a metal and R an alkyl radicle, are effective and either commercially available or easily prepared from commercial products, these compounds are generally employed.

The precipitation of the metallic impurities from the solution undergoing treatment is effected by interaction between the impurity and the aforesaid compound, the impurity metal combining to form a xanthate or xanthate type salt, which is insoluble in and is consequently precipitated from the solution, while the metallic base of the original xanthate or xanthate type precipitant forms a salt of the acid originally combined with the metallic impurity. It is, therefore, evident that if said latter salt is a soluble one, the metallic base of the precipitant must be such as can be permitted to enter into the solution without detriment thereto. A suitable salt is zinc xanthate, and the use of this salt is preferred. It introduces into the solution only the metal which is eventually to be recovered from the solution, while it is soluble in the solution to a sufficient extent to bring about the desired reaction with the impurity metals.

The alkali xanthates have also been successfully used but the alkali metal tends to build in concentration in the solution through the cyclic use thereof. In the case of the potassium salt, the concentration builds to about 40 grms. per litre potassium sulphate and thereafter remains constant. This concentration is not detrimental to the electrolysis of zinc sulphate solutions; but in the case of sodium, the increase in concentration is more serious. The presence of large quantities of sodium being undesirable, it is preferred to use a salt such as zinc xanthate which does not introduce into the solution deleterious impurity of any nature.

Zinc xanthate for use as a precipitating agent in the method herein specified may be prepared by mixing solutions of a soluble xanthate such as sodium or potassium xanthate and a soluble zinc salt such as zinc sulphate and filtering or otherwise separating the precipitate of zinc xanthate which results. Zinc xanthate is sufficiently insoluble in water to precipitate therefrom, while at the same time it is sufficiently soluble in zinc solution to enable the precipitation of the insoluble impurity xanthates to take place. The filtrate from the precipitation of the zinc xanthate reagent contains the alkali metallic base of the original xanthate and is discarded, the content of dissolved zinc xanthate being unimportant.

When xanthate salts other than that of zinc are directly added to the zinc solution for the purification thereof, the first reaction appears to be a precipitation of zinc xanthate which then dissolves in the solution to a sufficient extent to effect the purification. There is probably a certain amount of direct precipitation of the impurity metal by the xanthate salt added to the solution, but in general, the precipitation appears to be mainly effected through the medium of zinc xanthate. When sufficient quantities of xanthate are used, the solution becomes saturated with zinc xanthate and the excess of precipitated zinc xanthate remains in suspension throughout the solution. The dissolved zinc xanthate then reacts with a portion of the metallic impurity in the solution and precipitates the impurity as insoluble xanthate. The solution, being now more or less depleted of zinc xanthate, dissolves more zinc xanthate from the excess hitherto held in mechanical suspension and so causes further precipitation of the impurities. This action of precipitation of the impurity and solution of more zinc xanthate continues, as long as excess of the latter salt is present, till the solution is completely freed from metallic impurity. Where excess of xanthate has been used, the result is, therefore, a precipitate containing the impurity metals as xanthate mixed with excess zinc xanthate, depending on the amount of excess of the reagent employed. However, with control of the quantity of the precipitant used to that determined by test to be the minimum necessary for the proper precipitation of the impurities, loss of xanthate can be avoided and the impurity precipitate should consist of the impurity xanthate only, while the dissolved excess practically unavoidably present in the solution is sufficiently small to be negligible.

The metals, copper, cadmium, cobalt and nickel are completely removed by the use of the precipitating agent in suitable quantities. Copper is the most easily precipitable of these metals and its presence is distinctly advantageous in assisting the precipitation of the other, particularly cobalt and nickel. In most industrial zinc solutions sufficient copper for this purpose, say up to 0.2 or 0.3 gramme per litre, is already present; but if this is not the case it is desirable to add a soluble copper compound to the solution before precipitation.

The aforesaid reagent also precipitates arsenic and antimony from zinc solutions containing these impurities but the precipitation is not so readily effected nor is it so complete as that of the impurities previously mentioned. Mercury can also be readily removed from solution by use of the reagent.

In general, excess over the theoretical amount of the precipitating reagent is necessary to effect complete removal of any impurity. Copper can be readily precipitated by use of from two to two and one half times the theoretical amount of the reagent and cadmium by use of two and one half times, while the small quantities of nickel and cobalt which occur in zinc solutions require greater excesses than those above stated. The amount of the reagent for the precipitation of cadmium, cobalt and nickel or any mixture thereof, is affected by the presence of copper in the solution and by the amount of such copper, and is less than the sum of the amounts required by each of the impurities separately.

An advantage of the present method over those already known for removing cobalt or nickel is that heating of the solution is not required, the reaction being effective at normal temperatures. Elevated temperatures are not, however, detrimental provided they are below the decomposition temperature of the precipitating agent employed.

It is generally convenient to have the solution in a neutral or basic condition, but precipitation is usually effective when the solution is but slightly acid.

A method of carrying out the invention is as follows:—

Ore, roasted concentrate or other zinc bearing material is treated with sulphuric acid or spent electrolyte from the electrolyzing cells and the resulting solution is purified in the usual way by treatment with basic material and removal of the resulting precipitate. Zinc xanthate is then added in sufficient amount as determined by prior test and experience to effect the precipitation of the impurities. In general with the amounts of impurities which occur in industrial zinc solutions, this amount is such as to saturate the solution with zinc xanthate and to maintain saturation until the precipitation of the impurities is complete. The solution is agitated at normal temperatures until precipitation is complete, a period of half of an hour usually sufficing. The impurity precipitate is then separated, as by filtration, and the clear purified solution is passed directly to the electrolyzing cells for deposition of the zinc.

The impurity precipitate may be further treated to recover its metallic values, as, for example, by a reducing or an oxidizing roast to produce the metals or their oxides respectively.

We claim:—

1. The process of purifying zinc sulphate solution which comprises the step of precipitating metallic impurities by treating the solution with a compound of a derivative of dithiocarbonic acid of the type MS. CS. OR. where M is a radicle of which the aforesaid compound is appreciably soluble in the zinc solution under treatment and where R is an organic radicle.

2. The process of purifying zinc sulphate solution which comprises the step of precipitating metallic impurities by treating the solution with a compound of a derivative of dithiocarbonic acid of the type MS. CS. OR. where M is a radicle of which the aforesaid compound is appreciably soluble in the zinc solution under treatment and where R is the radicle of an alcohol.

3. The process of purifying zinc sulphate solution which comprises the step of precipitating metallic impurities by treating the solution with a compound of a derivative of dithiocarbonic acid of the type MS. CS. OR. where M is a radicle of which the aforesaid compound is appreciably soluble in the zinc solution under treatment and where R is an alkyl radicle.

4. The process of removing from zinc sulphate solution metallic impurity comprised in the group of metals consisting of copper, cadmium, nickel and cobalt which consists in treating the solution with a compound of a derivative of dithiocarbonic acid of the type MS. CS. OR. where M is a radicle of which the aforesaid compound is appreciably soluble in the zinc solution under treatment and where R is an organic radicle, and separating the precipitate thus formed.

5. The process of removing from zinc sulphate solution metallic impurity comprised in the group of metals consisting of copper, cadmium, nickel and cobalt which consists in treating the solution with a compound of a derivative of dithiocarbonic acid of the type MS. CS. OR. where M is a radicle of which the aforesaid compound is appreciably soluble in the zinc solution under treatment and where R is the radicle of an alcohol, and separating the precipitate thus formed.

6. The process of removing from zinc sulphate solution metallic impurity comprised in the group of metals consisting of copper, cadmium, nickel and cobalt which consists in treating the solution with a compound of a derivative of dithiocarbonic acid of the type MS. CS. OR. where M is a radicle of which the aforesaid compound is appreciably soluble in the zinc solution under treatment and where R is an alkyl radicle, and separating the precipitate thus formed.

7. The process of removing from zinc sulphate solution metallic impurity comprised in the group of metals consisting of cadmium, nickel and cobalt which consists in treating the solution in the presence of a soluble compound of copper with a compound of a derivative of dithiocarbonic acid of the type MS. CS. OR. where M is a radicle of which the aforesaid compound is appreciably soluble in the zinc solution under treatment and where R is an organic radicle, and separating the precipitate thus formed.

8. The process of removing from zinc sulphate solution metallic impurity comprised in the group of metals consisting of cadmium, nickel and cobalt which consists in treating the solution in the presence of a soluble compound of copper with a compound of a derivative of dithiocarbonic acid of the type MS. CS. OR. where M is a radicle of which the aforesaid compound is appreciably soluble in the zinc solution under treatment and where R is the radicle of an alcohol, and separating the precipitate thus formed.

9. The process of removing from zinc sulphate solution metallic impurity comprised in the group of metals consisting of cadmium, nickel and cobalt which consists in treating the solution in the presence of a soluble compound of copper with a compound of a derivative of dithiocarbonic acid of the type MS. CS. OR. where M is a radicle of which the aforesaid compound is appreciably soluble in the zinc solution under treatment and where R is an alkyl radicle, and separating the precipitate thus formed.

In testimony whereof we affix our signatures.

ROYALE HILLMAN STEVENS.
GERALD CHAD NORRIS.
WILLIAM NELSON WATSON.